United States Patent Office 3,333,599
Patented Aug. 1, 1967

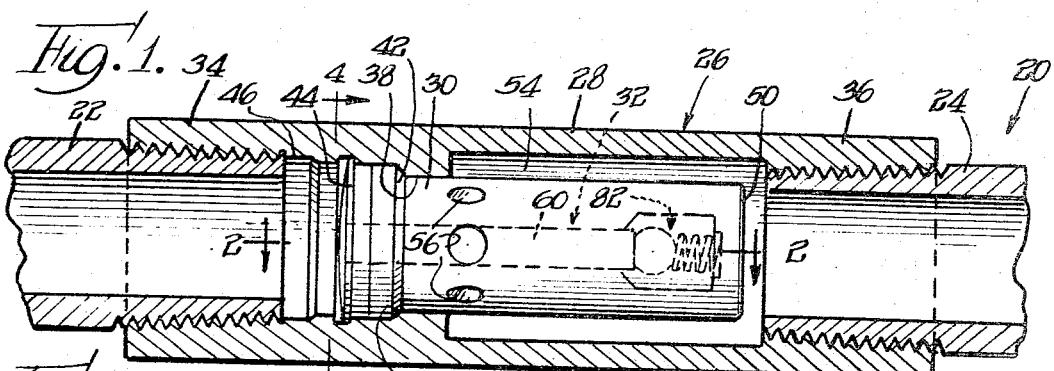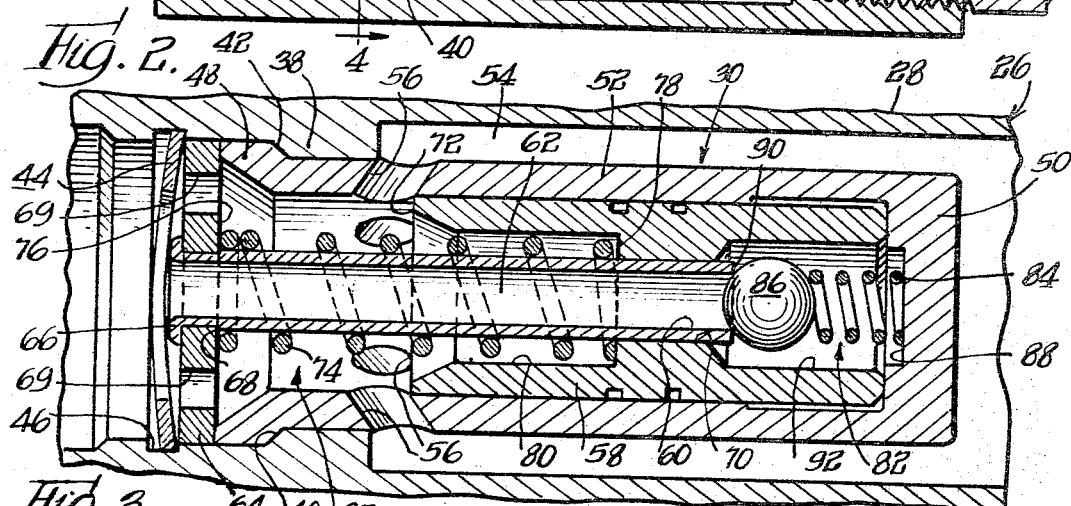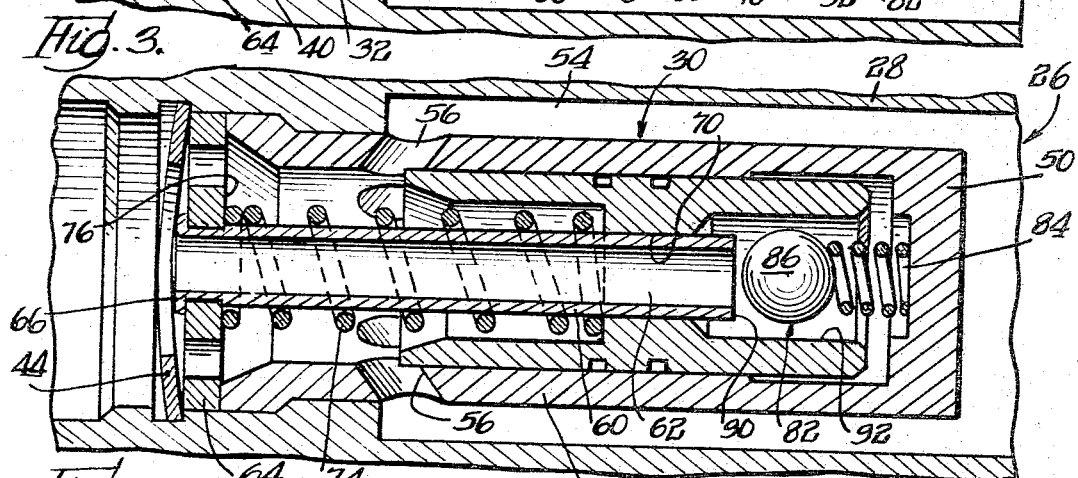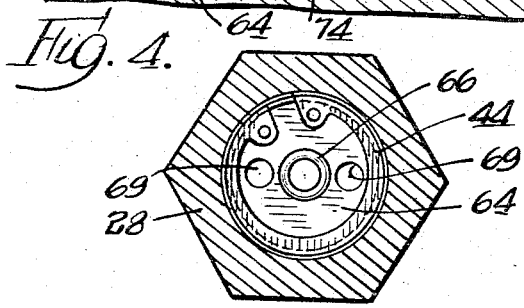

3,333,599
STRAIGHT-THROUGH FLOW REGULATING VALVE
Stephen C. Baker, Hinsdale, Ill (% Ste-Art Co., 1611 S. Newberry Ave., Chicago, Ill. 60608)
Filed June 8, 1965, Ser. No. 462,333
9 Claims. (Cl. 137—501)

ABSTRACT OF THE DISCLOSURE

A pressure-compensating valve for maintaining constant volume flow wherein a radially ported, internal sleeve has a closed downstream end and receives slidably a first tubular element, a second tubular element being disposed within the first tubular element to direct flow against a spring-biased valve ball for selectively liberating an expansion of fluid behind the slidable tubular element so as to relocate that member and close the radial ports partially.

This invention relates generally to flow regulating valves and more particularly to valves intended to provide a constant rate of flow irrespective of variations in the pressure of the flowing fluid.

In the past, various types of flow regulating valves have been devised in such a way as to compensate for variations in the inlet pressure. However, one common fault of these prior art valves has been their tendency to remain in a condition for controlling a pressure surge long after the surge has passed. Another difficulty has been the tendency of the valving element to oscillate alternately on each side of the proper position of regulation, thus producing a pulsating flow.

An important object of the present invention is therefore to provide a flow regulating valve in which there is a positive movement of the valving element in response to each change in the pressure of the fluid flowing through the valve.

A more general object of the invention is to provide a new and improved flow regulating valve.

Another object of the invention is to provide a flow regulating valve which is arranged to minimize any tendency of the valving element to stick in the surge compensating position.

A further object of the invention is to provide a flow regulating valve which is arranged to repress hunting of the valving element.

A still further object of the invention is to provide a flow regulating valve which is easy to use and economical to manufacture.

And a still further object of the invention is to provide a novel and highly useful flow regulating valve of the type in which the inlet and the outlet are disposed in straight line relationship.

These and other objects and features of the invention will become more apparent from the following descriptions.

A flow regulating valve in accord with the invention includes a housing having an inlet and an outlet and a sleeve unit mounted in the housing, the sleeve unit includes a tubular wall that is spaced from the housing to define a flow passageway and is provided with generally radial ports communicating that passageway with the interior of the sleeve unit. A pressure compensating arrangement is situated in the sleeve unit and comprises a pair of coaxial tubular elements that are arranged for relative slidable movement, the pressure compensating arrangement additionally including a valve element selectively opening the downstream end of one of the tubular elements so as to pass inlet fluid into contact with the downstream end of the other tubular element. One of the tubular elements is provided with a valve surface which is disposed to cooperate with the ports and the sleeve unit to regulate the flow between the inlet and the outlet.

The invention, both as to its structure and its mode of operation, will be better understood by reference to the following disclosure and drawing forming a part thereof wherein:

FIG. 1 is a longitudinal sectional view taken through a portion of a fluid transfer system incorporating flow regulating valve means constructed in compliance with the principles of the present invention, the sleeve unit of the valve means being shown in elevation and certain elements of the valve means being indicated in broken outline;

FIG. 2 is an enlarged longitudinal sectional view taken through the flow regulating valve means and illustrating the components in position for passing a flow of fluid at a normal pressure;

FIG. 3 is a view similar to the showing of FIG. 2 but illustrating the components in position to compensate for a sudden increase in pressure of the flowing fluid; and FIG. 4 is a view taken substantially along the line 4—4 of FIG. 1.

Referring now in detail to the drawing, specifically to FIG. 1, a fluid transfer system indicated generally by the numeral 20 is seen to comprise an upstream conduit 22, a downstream conduit 24 and a flow regulating valve 26 disposed flowpathwise intermediate the conduits 22 and 24. The fluid transfer system which comprises the enumerated components is intended to carry a fluid such as water or oil that is employed as a force transfer medium and that is desired to be transferred at a substantially uniform rate. By way of specific example, the illustrated system may be used in hydraulic hoists and analogous devices.

Considering FIG. 2 in conjunction with FIG. 1, the flow regulating valve 26 comprises a tubular valve body or housing 28, a sleeve unit 30 and a pressure compensating arrangement 32. The housing 28 is fashioned with an inlet end 34 and an outlet end 36 which are disposed in straight line relationship and which are arranged for connection respectively to the conduits 22 and 24. Specifically, the inlet and outlet ends of the housing 28 are internally threaded to receive the cooperatively threaded ends of conduits 22 and 24; but as will be recognized, other forms of connection, such as brazing for example, may be employed in place of the threaded connections. The housing 28 is also fashioned with a medial constriction 38 that defines a frusto-conical shoulder 40; and the shoulder 40 supports a cooperatively shaped, radially projecting surface 42 of the sleeve unit 30. A C-shaped retainer ring 44 is situated in an annular groove 46 in housing 28 for maintaining the surface 42 of sleeve unit 30 in contact with the frusto-conical shoulder 40. Thus, the sleeve unit 30 is fixedly mounted in the housing 28.

The sleeve unit 30 is made up of an upstream end or mouth 48 which opens into the inlet end 34 of the housing 28, the sleeve unit 30 adidtionally including a closed end or wall 50 and a tubular wall 52. The closed end or wall 50 is disposed facing in the downstream direction confronting the outlet defined by conduit 24, and the tubular wall 52 is arranged generally coaxially with the housing 28 spaced radially inwardly from the interior wall of that member to define an annular flow passageway 54. In addition, the tubular wall 52 is fashioned with circumferentially spaced, generally radially opening ports 56 which communicate the interior of the sleeve unit 30 with the passageway 54. The ports 56 are generally inclined from the longitudinal axis of sleeve unit and in a slight downstream direction to facilitate movement of fluid from the mouth 48 into the passageway 54. This angulation of the ports 56 is well illustrated in FIG. 2.

In compliance with the features of the invention, the pressure compensating arrangement 32 cooperates with the sleeve unit 30 in regulating the flow through the ports 56. Broadly, the pressure compensating arrangement 32 comprises a pair of coaxial, relatively slidable, tubular elements and a valve element that selectively opens the downstream end of one of the tubular elements to pass inlet fluid into contact with the downstream end of the other tubular element. Specifically, a tubular piston 58 is slidably disposed in the tubular wall 52 of sleeve unit 30, and a conduit 60 is fixed in position with respect to housing 28, being disposed to define an axial flow passageway 62 that opens from the inlet generally through the piston 58.

In the illustrated embodiment, the means for fixing the conduit 60 in position comprise a washer 64 that is held in position against the mouth 48 of sleeve unit 30 by the retainer ring 44, the washer 64 being centrally perforated to pass a reduced end of the conduit 60 and that end being flanged over to define an annular head 66 that secures the washer 64 against a shoulder 68 that is developed at the root of the reduced end portion. Washer 64 is apertured with holes 69 for passing fluid in a generally downstream direction. The piston 58 is fashioned with an interior guide surface 70 which slidably engages the exterior surface of conduit 60, and the piston 58 is additionally provided with a valve surface 72 which is disposed to cooperate with the ports 56 in regulating the flow of fluid therethrough, axial movement of the piston 58 in a generally upstream direction partially obstructing the ports to restrict flow in a manner to be described more fully hereinafter.

The piston 58 is intended to be biased generally out of obstructing relationship relative to the ports 56; and for this purpose, a compression spring 74 is coiled about the conduit 60 as a spring guide to be confined between an annular abutment wall 76 provided in the middle of washer 64 and a transverse annular wall 78 that is fashioned at the root of a generally cylindrical recess 80, recess 80 opening from the piston 58 in the upstream direction and being sized transversely to pass the coils of spring 74 without contact therewith.

In compliance with an important feature of the invention, a ball valve unit 82 is arranged to obstruct the flow through conduit 60 in a selective manner and in response to the pressure of the fluid flowing into the inlet of housing 28. The ball valve unit 82 includes a coiled compression spring 84 and a valve ball 86. The spring 84 seats in a recess 88 that is fashioned in the downstream end of sleeve unit 30, and the spring 84 biases the valve ball 86 normally against a seat surface 90 at the end of conduit 60.

The terminal coil of spring 84 fittedly receives a portion of the valve ball 86 to hold the same generally in position; and it is to be recognized that the resiliency of spring 84 permits separation of the valve ball 86 from the seat surface 90 to pass fluid under pressure from the conduit 60 and into contact with the downstream end of the sleeve unit 30. The downstream end of piston 58 is fashioned with a pocket 92, and the walls of this pocket react to the pressure of the fluid that is passed by the valve ball upon its separation from the seat surface 90.

For purposes of enhancing the understanding of the invention, it is advantageous to provide at this juncture a functional description of the operation of flow regulating valve 26. The valve 26 is first constructed to operate normally at some predetermined pressure; and the springs 74 and 84 together with the orifices defined by the holes 69 and the ports 56 are selected accordingly. When a flow at the predetermined pressure is passing through the valve 26 from the upstream conduit 22 to the downstream conduit 24, the piston 58 is positioned normally out of obstructing relationship with the ports 56 and the valve ball 86 is urged into seating engagement with the surface 90 as is shown in FIG. 2. However, when a surge of fluid presenting a pressure higher than the predetermined value is experienced in the valve 26, the conduit 60 passes the increased pressure to the valve ball 86 and the spring 84, spring 84 compressing in response whereby to permit separation of the valve ball from the seat surface 90 so as to pass fluid into the pocket 92. The expansion of fluid into the pocket 92 urges the piston 58 in a generally upstream direction and into partially obstructing relationship with the ports 56 as is shown in FIG. 3. Thus, the valve 26 responds automatically to increases in pressure to reduce the total orifice in proportion to the increase in pressure whereby to maintain the volumetric flow through the valve at a substantial constant value. Correspondingly, upon dissipation of the surge of increased pressure, the sfring 84 will return the valve ball 86 into seated condition relative to the surface 90, permitting the piston 58 to return to a generally non-obstructing condition relative to the ports 56. While the valve 26 has been described as operating in a system which experiences only normal and above normal pressures, the flow regulating valve of the invention may also be embodied in a fluid transfer system which experiences normal and both above and below normal pressures. In this latter circumstance, the various components of the valve 26 are arranged so that the piston 58 is normally disposed in partially obstructing relationship with respect to the ports 56 in order that the piston may respond to both increased and decreased pressures.

The drawing and the foregoing descriptions are not intended to represent the only possible form of my invention in regard to the details of its construction and manner of operation. Changes in form and the proportion of the parts as well as the substitution of equivalents are contemplated as circumstances may suggest or render expedient; and although specific terms have been employed, they are intended in a generic and descriptive sense only and not for the purposes of limitation, the scope of the invention being defined in the following claims.

The invention is claimed as follows:

1. A flow regulating valve comprising: housing means having an inlet and an outlet; sleeve means in said housing, including an upstream end opening into said inlet, a closed end confronting said outlet, and a tubular wall between said ends spaced radially from said housing to define a first flow passageway and having generally radial ports communicating the interior of said sleeve means with said passageway; and pressure compensating means in said sleeve means, including a pair of coaxial tubular elements arranged for relative slidable movement and including a valve element selectively opening the downstream end of one of said tubular elements to pass inlet fluid into contact with the downstream end of the other of said tubular elements, one of said tubular elements having valve surface means disposed to cooperate with said ports in regulating the flow between said inlet and said outlet.

2. A flow regulating valve according to claim 1 wherein the downstream end of said other tubular element is formed with a pocket, the walls of which react to the pressure of the fluid passed by said valve element.

3. A flow regulating valve according to claim 1 wherein said ports are inclined in a generally downstream direction.

4. A flow regulating valve comprising: housing means having an inlet and an outlet; sleeve means in said housing, including an upstream end opening into said inlet, a closed end confronting said outlet, and a tubular wall between said ends spaced radially from said housing to define a first flow passageway and having generally radial ports communicating the interior of said sleeve means with said passageway; tubular piston means slidably disposed in said sleeve means, including valve surface means arranged to cooperate with said ports in regulating the flow between said inlet and said outlet; conduit means fixed in position with respect to said housing and arranged to define a second flow passageway, said second flow passageway opening from said inlet through said piston means and said conduit means having an open end facing the closed end of said sleeve means; means for biasing said piston means toward the closed end of said sleeve means; and valve means arranged to obstruct the flow through said conduit means selectively and in response to the pressure of the fluid flowing into said inlet.

5. A flow regulating valve comprising: housing means having an inlet and an outlet; sleeve means in said housing, including an upstream end opening into said inlet, a closed end confronting said outlet; and a tubular wall between said ends spaced radially from said housing to define a first flow passageway and having generally radial ports communicating the interior of said sleeve means with said passageway; tubular piston means slidably disposed in said sleeve means, including valve surface means arranged to cooperate with said ports in regulating the flow between said inlet and said outlet; conduit means fixed in position with respect to said housing and arranged to define a second flow passageway, said second flow passageway opening from said inlet through said piston means, said conduit means having an open end facing the closed end of said sleeve means and said conduit means including valve seat means in said open end; means for biasing said piston means toward the closed end of said sleeve means; and ball valve means arranged to obstruct the flow through said conduit means selectively and in response to the pressure of the fluid flowing into said inlet, including a valve ball adapted to close against said seat means and spring means normally biasing said valve ball against said seat and permitting separation of said valve ball from said seat means to pass fluid under pressure into contact with the downstream end of said piston means to urge said piston means into position selectively closing said ports.

6. A flow regulating valve comprising: housing means having an inlet and an outlet; sleeve means in said housing, including an upstream end opening into said inlet, a closed end confronting said outlet; and a tubular wall between said ends spaced radially from said housing to define a first flow passageway and having generally radial ports communicating the interior of said sleeve means with said passageway; abutment means in one of said housing means and said sleeve; tubular piston means slidably disposed in said sleeve means, including a transverse wall confronting said inlet and including valve surface means arranged to cooperate with said ports in regulating the flow between said inlet and said outlet; conduit means fixed in position with respect to said housing and arranged to define a second flow passageway, said second flow passageway opening from said inlet through said piston means and said conduit means having an open end facing the closed end of said sleeve means; spring means disposed between said transverse wall and said abutment means for biasing said piston means toward the closed end of said sleeve means; and valve means arranged to obstruct the flow through said conduit means selectively and in response to the pressure of the fluid flowing into said inlet.

7. A flow regulating valve comprising: housing means having an inlet and an outlet disposed in straight line relationship; sleeve means fixedly mounted in said housing, including an upstream end opening into said inlet, a closed end confronting said outlet, and a tubular wall between said ends spaced radially from said housing to define a first flow passageway and having generally radial ports communicating the interior of said sleeve means with said passageway; abutment means in one of said housing means and said sleeve means; tubular piston means slidably disposed in said sleeve means, including an annular transverse wall confronting said inlet and including valve surface means arranged to cooperate with said ports in regulating the flow between said inlet and said outlet; conduit means fixed in position with respect to said housing and arranged to define a second flow passageway, said second flow passageway opening from said inlet through said piston means, said conduit means having an open end facing the closed end of said sleeve means and said conduit means including valve seat means in said open end; compression spring means disposed between said transverse wall and said abutment means for biasing said piston means toward the closed end of said sleeve means; and ball valve means arranged to obstruct the flow through said conduit means selectively and in response to the pressure of the fluid flowing into said inlet, including a valve ball adapted to close against said seat means and coiled compression spring means normally biasing said valve ball against said seat and permitting separation of said valve ball from said seat means to pass fluid under pressure into contact with the downstream end of said piston means to urge said piston means into position selectively closing said ports.

8. A flow regulating valve according to claim 7 wherein the downstream end of said piston means is formed with a pocket, the walls of which react to the pressure of the fluid passed by said valve ball.

9. A flow regulating valve according to claim 7 wherein said ports are inclined in a generally downstream direction.

References Cited
UNITED STATES PATENTS

| | | | |
|---|---|---|---|
| 2,881,794 | 4/1959 | Baldwin et al. | 137—501 |
| 2,973,778 | 3/1961 | Baker | 137—501 |
| 3,064,676 | 11/1962 | Baker | 137—501 |

M. CARY NELSON, *Primary Examiner.*

R. J. MILLER, *Assistant Examiner.*